United States Patent
Kondo et al.

(10) Patent No.: US 10,093,771 B2
(45) Date of Patent: Oct. 9, 2018

(54) POLYESTER RESIN, METHOD FOR MANUFACTURING POLYESTER RESIN, AND COATING COMPOSITION CONTAINING POLYESTER RESIN

(71) Applicant: Mitsubishi Rayon Co., Ltd., Tokyo (JP)

(72) Inventors: Akifumi Kondo, Toyohashi (JP); Yoko Tamura, Toyohashi (JP); Masaaki Kiura, Toyohashi (JP); Asako Kaneko, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 15/305,121

(22) PCT Filed: Apr. 23, 2015

(86) PCT No.: PCT/JP2015/062356
§ 371 (c)(1),
(2) Date: Oct. 19, 2016

(87) PCT Pub. No.: WO2015/163400
PCT Pub. Date: Oct. 29, 2015

(65) Prior Publication Data
US 2017/0037182 A1    Feb. 9, 2017

(30) Foreign Application Priority Data

Apr. 25, 2014 (JP) ................. 2014-090984

(51) Int. Cl.
| | | |
|---|---|---|
| *C08G 63/78* | (2006.01) | |
| *C08G 63/672* | (2006.01) | |
| *C08L 67/02* | (2006.01) | |
| *C08G 63/668* | (2006.01) | |
| *C09D 167/00* | (2006.01) | |
| *C08L 67/00* | (2006.01) | |
| *C09D 167/02* | (2006.01) | |

(52) U.S. Cl.
CPC ......... *C08G 63/672* (2013.01); *C08G 63/668* (2013.01); *C08G 63/78* (2013.01); *C08L 67/00* (2013.01); *C08L 67/025* (2013.01); *C09D 167/00* (2013.01); *C09D 167/025* (2013.01)

(58) Field of Classification Search
USPC .................. 528/300, 307; 524/604
See application file for complete search history.

(56) References Cited

U.S. PATENT DOCUMENTS

| | | | | |
|---|---|---|---|---|
| 9,120,949 | B2 * | 9/2015 | Kim .................. | C08G 63/60 |
| 2011/0281972 | A1 * | 11/2011 | Beccaria ............. | C08G 63/48 |
| | | | | 523/400 |
| 2012/0220676 | A1 * | 8/2012 | Moens .............. | C08G 63/672 |
| | | | | 521/48.5 |
| 2014/0018484 | A1 | 1/2014 | Kim et al. | |

FOREIGN PATENT DOCUMENTS

| | | |
|---|---|---|
| EP | 2 523 046 A2 | 11/2012 |
| JP | 2010-503736 A | 2/2010 |
| JP | 2010-095696 A | 4/2010 |
| JP | 2013-510917 A | 3/2013 |
| KR | 10-2011-0081572 A | 7/2011 |
| WO | 2008/031592 A1 | 3/2008 |
| WO | 2011/058130 A1 | 5/2011 |

OTHER PUBLICATIONS

Noordover et al., Co- and Terpolyesters Based on Isosorbide and Succinic Acid for Coating Applications: Synthesis and Characterization, Biomacromolecules, vol. 7, Issue 12, pp. 3406-3416 (2006).
Noordover et al., Biobased step-growth polymers in powder coating applications, Progress in Organic Coatings, vol. 65, Issue 2, pp. 187-196 (2009).
Gioia et al., Sustainable polyesters for powder coating applications from recycled PET, isosorbide and succinic acid, Green Chemistry, vol. 16, Issue 4, pp. 1807-1815 (2014).
International Search Report issued in corresponding International application No. PCT/JP2015/062356 dated Aug. 4, 2015.
Extended European Search Report issued in corresponding European Patent Application No. 15782545.6 dated Mar. 3, 2017.

* cited by examiner

*Primary Examiner* — Tae H Yoon
(74) *Attorney, Agent, or Firm* — Morgan, Lewis & Bockius LLP

(57) ABSTRACT

The present invention relates to a polyester resin with excellent solubility in generic solvents, especially with excellent solubility at a temperature of 0° C. or lower. According to the present invention, by using the polyester resin with excellent solubility in generic solvents, solubility at a lower temperature, especially the solubility at a temperature of 0° C. or lower, is enhanced, making it easier to prepare paints, coatings and the like. The polyester resin related to the present invention contains 0.05 to 0.5 mol of an isosorbide-derived structural unit and 0.015 to 0.4 mol of a trihydric or higher alcohol-derived structural unit relative to 1 mol of a polycarboxylic acid-derived structural unit.

10 Claims, No Drawings

POLYESTER RESIN, METHOD FOR MANUFACTURING POLYESTER RESIN, AND COATING COMPOSITION CONTAINING POLYESTER RESIN

TECHNICAL FIELD

The present invention relates to a polyester resin with excellent solubility in solvents. Also, the present invention relates to a method for manufacturing the polyester resin as well as to a coating composition containing the polyester resin.

The present invention is based upon and claims the benefit of priority to Japanese Patent Application No. 2014-090984, filed Apr. 25, 2014, the entire contents of which are incorporated herein by reference.

BACKGROUND ART

Polyester resins are used in a wide variety of applications such as coating materials, adhesives and films. Polyester resins in such applications need to exhibit excellent solubility in generic solvents.

Also, polyester resins made of biomass-derived monomers have been studied to alleviate global warming concerns.

For example, isosorbide is a dihydric alcohol, and is used as a biomass-derived monomer for forming a copolymerized polyester resin described in Patent Literature 1. The obtained polyester resin is soluble in generic solvents and is used in coating materials, adhesives and the like.

CITATION LIST

Patent Literature

Patent Literature 1: JP2010-095696A

SUMMARY OF THE INVENTION

Problems to be Solved by the Invention

However, the polyester resin described in Patent Literature 1 does not have sufficient solubility in generic solvents. Especially, to use the polyester resin when temperatures are low during winter or in cold regions, it is necessary to heat solvents or the like.

The present invention was carried out to solve the above problems. Its objective is to provide a polyester resin with excellent solubility in generic solvents, especially with excellent solubility in temperature conditions of 0° C. or lower.

Solutions to the Problems

The inventors of the present invention have studied the above problems intensively and found that when a polyester resin includes a predetermined content of an isosorbide-derived structural unit and a predetermined content of a trihydric or higher alcohol-derived structural unit relative to the structural unit derived from a polycarboxylic acid, it exhibits excellent solubility under low-temperature conditions, especially at or lower than 0° C.

The present invention has the following aspects.

[1] A polyester resin, containing 0.05 to 0.5 mol of an isosorbide-derived structural unit and 0.015 to 0.4 mol of a trihydric or higher alcohol-derived structural unit relative to 1 mol of a polycarboxylic acid-derived structural unit.

[2] The polyester resin according to [1], containing 0.015 to 0.2 mol of a trihydric or higher alcohol-derived structural unit relative to 1 mol of a polycarboxylic acid-derived structural unit.

[3] The polyester resin according to [1] or [2], containing 0.05 to 0.4 mol of an isosorbide-derived structural unit relative to 1 mol of a polycarboxylic acid-derived structural unit.

[4] The polyester resin according to any of [1] to [3], containing a structural unit derived from a dihydric alcohol that is other than isosorbide and has an alicyclic skeleton.

[5] The polyester resin according to [4], in which the dihydric alcohol having an alicyclic skeleton is 1,4-cyclohexanedimethanol.

[6] The polyester resin according to [4] or [5], containing 0.001 to 0.15 mol of a dihydric alcohol-derived structural unit having an alicyclic skeleton relative to 1 mol of polycarboxylic acid-derived structural unit.

[7] The polyester resin according to any of [1] to [6], in which the glass transition temperature is 50 to 90° C.

[8] A method for manufacturing a polyester resin by polycondensing a polycarboxylic acid component and a polyhydric alcohol component that contains 0.05 to 0.5 mol of isosorbide and 0.015 to 0.4 mol of a trihydric or higher alcohol relative to 1 mol of the polycarboxylic acid component.

[9] A polyester resin solution, containing the polyester resin according to any of [1] to [7] and a solvent.

[10] The polyester resin solution according to [9], in which the solvent is an organic solvent.

[11] A coating composition, containing the polyester resin solution described in [9] or [10].

[12] The coating composition according to [11], in which the polyester resin described in any of [1] to [7] is contained at 5 to 60 mass % of the total mass of the polyester resin solution.

Effects of the Invention

By using polyester resins related to the present invention that exhibit excellent solubility in generic solvents, the solubility of paints, coating materials and the like at low temperatures, especially solubility at or lower than 0° C., is improved making it easier to prepare such materials.

DETAILED DESCRIPTION OF THE EMBODIMENTS

Embodiments of the present invention are described in the following. However, the embodiments below are set simply to describe the present invention, and practicing the present invention is not limited to those embodiments. Various modifications and variations are possible unless they deviate from the gist of the present invention.

In the present application, the entire contents of all the cited publications, for example, technical literature, published patent applications, published patents and other patent literatures, are incorporated herein by reference.

<Polyester Resin>

The polyester resin according to an embodiment of the present invention contains 0.05 to 0.5 mol of an isosorbide-derived structural unit and 0.015 to 0.4 mol of a trihydric or higher alcohol-derived structural unit relative to 1 mol of a polycarboxylic acid-derived structural unit.
<Polyhydric Alcohol Component>
In the present application, "polyhydric alcohol" includes "isosorbide" and "trihydric or higher alcohols" listed below, and may also include "dihydric alcohols that are other than isosorbide and have an alicyclic skeleton" and "polyhydric alcohols other than those alcohols."
<Isosorbide>
When a polyester resin related to the present invention contains 0.05 to 0.5 mol of an isosorbide-derived structural unit relative to 1 mol of a polycarboxylic acid-derived structural unit, its storage stability and solubility are improved. Relative to 1 mol of the polycarboxylic acid-derived structural unit, if the content of an isosorbide-derived structural unit is less than 0.05 mol, the storage stability tends to be insufficient, and if the content exceeds 0.5 mol, moisture resistance tends to be lowered. The content of an isosorbide-derived structural unit relative to 1 mol of the polycarboxylic acid-derived structural unit is preferred to be 0.2 mol or greater in view of solubility, and 0.4 mol or less in view of moisture resistance.

Examples of isosorbide are biomass derived products such as Polysorb-P and Polysorb-PB made by Roquette, and a technical or polymer grade made by ADM.
<Dihydric Alcohol having Alicyclic Skeleton>
A polyester resin related to the present invention may also contain a structural unit derived from a dihydric alcohol that is other than isosorbide and has an alicyclic skeleton. Examples of such a non-isosorbide dihydric alcohol having an alicyclic skeleton are preferred to be those having C5 to C16 alicyclic hydrocarbon, for example, cyclohexanedimethanol such as 1,4-cyclohexanedimethanol;
2,2-bis(4-hydroxycyclohexyl)propane; tricyclodecane diol such as
tricyclo[5.2.1.0(2,6)]decane-4,8-diol; tricyclodecanedimethylol such as
tricyclo[5.2.1.0(2,6)]decane-4,8-dimethanol; cyclohexanediol such as
cyclohexane-1,4-diol; and the like. Among those dihydric alcohols having an alicyclic skeleton, 1,4-cyclohexanedimethanol is preferred because it enhances solubility.

One type or more than one type of structural unit derived from dihydric alcohol having an alicyclic skeleton may be contained in a polyester resin related to the present invention.

In a polyester resin related to the present invention, the content of a structural unit derived from a dihydric alcohol, which is other than isosorbide and has an alicyclic skeleton, is preferred to be 0.001 to 0.15 mol relative to 1 mol of the polycarboxylic acid-derived structural unit. Relative to 1 mol of a polycarboxylic acid-derived structural unit, if the content of such a structural unit derived from a non-isosorbide dihydric alcohol having an alicyclic skeleton is less than 0.001 mol or exceeds 0.15 mol, solubility tends to be insufficient. Namely, when the content of a structural unit derived from a non-isosorbide dihydric alcohol having an alicyclic skeleton relative to 1 mol of a polycarboxylic acid-derived structural unit is in the above range, sufficient solubility is achieved. Considering solubility, the lower limit of the content of a structural unit derived from a non-isosorbide dihydric alcohol having an alicyclic skeleton is preferred to be 0.05 mol, and the upper limit is preferred to be 0.15 mol, relative to 1 mol of a polycarboxylic acid-derived structural unit.

<Trihydric or Higher Alcohol>
A polyester resin related to the present invention contains a trihydric or higher alcohol-derived structural unit. Examples of trihydric or higher alcohols are sorbitol, 1,2,3,6-hexatetralol, 1,4-sorbitan pentaerythritol, dipentaerythritol, tripentaerythritol,
1,2,4-butanetriol, 1,2,5-pentatriol, glycerin, 2-methylpropanetriol,
2-methyl-1,2,4-butanetriol, trimethylolpropane, 1,3,5-trihydroxymethylbenzene, and the like. Among those listed, trimethylolpropane, glycerin and pentaerythritol are preferred.

One type or more than one type of those structural units derived from trihydric or higher alcohols may be contained in the polyester resin related to the present invention.

In a polyester resin related to the present invention, the content of a trihydric or higher alcohol-derived structural unit is preferred to be 0.015 to 0.4 mol relative to 1 mol of the polycarboxylic acid-derived structural unit. Relative to 1 mol of the polycarboxylic acid-derived structural unit, if the content of a trihydric or higher alcohol-derived structural unit is 0.015 mol or greater, crystallization is expected to be suppressed, whereas if the content of the trihydric or higher alcohol-derived structural unit is 0.4 mol or less, gelation is expected to be suppressed. To suppress both crystallization and gelation, the upper limit of the content of a trihydric or higher alcohol-derived structural unit is preferred to be 0.2 mol more preferably 0.1 mol, relative to 1 mol of the polycarboxylic acid-derived structural unit.
<Polyhydric Alcohol Other than the Above>
A polyester resin related to the present invention may also contain a structural unit derived from a polyhydric alcohol in addition to isosorbide, a dihydric alcohol having an alicyclic skeleton and a trihydric or higher alcohol. Examples of such polyhydric alcohols are diols such as ethylene glycol, neopentyl glycol, 1,2-propanediol, 1,3-propanediol, 1,3-butanediol, 1,4-butanediol, diethylene glycol, triethylene glycol, and polyethylene glycol; bisphenol A, bisphenol A-alkylene oxide adducts such as polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2,0)-2,2-bis(4-hydroxyphenyl) propane,
polyoxypropylene(6)-2,2-bis(4-hydroxyphenyl)propane, polyoxypropylene-(2.2)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane; and the like. Among those polyhydric alcohols, ethylene glycol and neopentyl glycol are preferred from the viewpoint of resin transparency.

In a polyester resin related to the present invention, one type or more than one type of those polyhydric alcohol-derived structural units may also be contained in addition to the alcohols listed earlier.

In a polyester resin related to the present invention, the content of a structural it derived from a polyhydric alcohol other than the alcohols mentioned earlier is preferred to be 0.3 to 0.9 mol, more preferably 0.5 to 0.9 mol, relative to 1 mol of the polycarboxylic acid-derived structural unit.
<Polycarboxylic Acid Component>
In the embodiments of the present invention, the "polycarboxylic acid component" includes "polycarboxylic acids" listed below.
<Polycarboxylic Acid>
A polyester resin related to the present contains a polycarboxylic acid-derived structural unit. The polycarboxylic acids in the present application include derivatives such as their esters and anhydrides. Examples of polycarboxylic acids are terephthalic acid, isophthalic acid, and their esters such as dimethyl terephthalate, dimethyl isophthalate, diethyl terephthalate, diethyl isophthalate, dibutyl terephthalate, and dibutyl isophthalate; aliphatic polycarboxylic acids such as phthalic acid sebacic acid, isodecyl succinic acid, dodecenyl succinic acid, maleic acid, fumaric acid adipic acid, succinic acid, 1,2,5-hexanetricarboxylic acid, 1,2,7,8-octanetetracarboxylic acid, fumaric anhydride, maleic anhydride, adipic anhydride, and succinic anhydride along with their esters and anhydrides; alicyclic or aromatic polycarboxylic acids such as trimellitic acid, pyromellitic acid, 1,2,4-cyclohexanetricarboxylic acid 2,5,7-naphthalenetricarboxylic acid, 1,2,4-naphthalenetricarboxylic acid, trimellitic anhydride, and pyromellitic anhydride along with their esters and anhydrides; and the like. Among them, terephthalic acid and isophthalic acid are preferred from the viewpoint of antiblocking properties.

One type or more than one type of those structural units derived from polycarboxylic acids may be contained in a polyester resin related to the present invention.

Considering antiblocking properties, the ratio (mol %) of terephthalic acid and isophthalic acid in a polycarboxylic acid component is preferred to be terephthalic acid/isophthalic acid=100/0 to 5/95, more preferably 80/20 to 20/80, even more preferably 70/30 to 30/70, especially preferably 60/40 to 40/60.

Moreover, the glass transition temperature of a polyester resin related to the present invention is preferred to be 50° C. to 90° C. A glass transition temperature of 50° C. or higher is expected to enhance the storage stability of the polyester resin, and if it is 90° C. or lower, solubility of the resin in a solvent is expected to be excellent. The lower limit of the glass transition temperature of a polyester resin related to the present invention is more preferred to be 60° C., and the upper limit is more preferred to be 80° C.

The weight-average molecular weight (Mw) of a polyester resin related to the present invention measured by gel permeation chromatography (GPC) is preferred to be set in a range of 5000 to 50000. When the weight-average molecular weight (Mw) of a polyester resin is 5000 or greater, durability is expected to be excellent, and if the Mw is 50000 or less, the resin solubility in a solvent is expected to be excellent.

The Mw in terms of standard polystyrene was determined under the conditions below:
instrument: HLC8020, made by Tosoh Corporation
column: TSKgel GMHXL (column size: 7.8 mm (ID)×30.0 cm (L)), made by Tosoh Corporation: three columns connected in series
oven temperature: 40° C.
eluent: tetrahydrofuran (THF)
sample concentration: 4 mg/10 mL
filtration conditions: Sample solution to be filtrated by 0.45 μm Teflon® membrane filter
flow rate: 1 mL/min.
injection: 0:1 mL
detector: RI
standard polystyrene samples for preparing a calibration curve: TSK standards, made by Tosoh Corporation: A-500 (molecular wt. $5.0 \times 10^2$), A-2500 (molecular wt. $2.74 \times 10^3$), F-2 (molecular wt. $1.96 \times 10^4$), F-20 (molecular wt. $1.9 \times 10^5$), F-40 (molecular wt. $3.55 \times 10^5$), F-80 (molecular wt. $7.06 \times 10^5$), F-128 (molecular wt. $1.09 \times 10^6$), F-288 (molecular wt. $2.89 \times 10^6$), F-700 (molecular wt. $6.77 \times 10^6$), and F-2000 (molecular wt. $2.0 \times 10^7$).

<Method for Manufacturing Polyester Resin>

A polyester resin related to the present invention is manufactured by polycondensing a polyhydric alcohol component and a polycarboxylic acid component.

The polycondensation method is not limited specifically, for example, a polyester resin may be manufactured by adding a polycarboxylic acid component and a polyhydric alcohol component listed above into a reactor, and by carrying out esterification, transesterification, or polycondensation reactions.

When polymerizing a polyester resin, a polymerization catalyst may be used; catalyst examples are titanium tetraalkoxide, titanium butoxide, titanium oxide, dibutyltin oxide, tin acetate, zinc acetate, tin disulfide, antimony trioxide germanium dioxide, magnesium acetate, or the like. The amount of polymerization catalyst may be appropriately adjusted considering various conditions such as types of polyhydric alcohol and polycarboxylic acid components to be used, temperature and time set for polycondensation, and so forth.

The temperature for polycondensation is not limited specifically, and is preferred to be set at 180° C. to 280° C. When the temperature of polycondensation is set at 180° C. or higher, productivity is expected to be enhanced, and at 280° C. or lower, decomposition of resin and formation of odor-causing volatile byproducts are expected to be suppressed. The lower limit of the polycondensation temperature is more preferred to be 200° C. or higher, especially preferably 220° C. or higher, whereas the upper limit is more preferred to be 270° C. or lower.

The time for carrying out polycondensation may be appropriately set by considering various polycondensation conditions such as temperature, types of polyhydric alcohol components and polycarboxylic acid components to be used, type of polymerization catalyst to be used, and so forth.

<Polyester Resin Solution>

A polyester resin related to the present invention may be used as a polyester resin solution by dissolving the resin in various solvents. Considering processability when used as paints and coating materials, the solution concentration is preferred to be 5 to 60 mass %, more preferably 15 to 45 mass %.

Solvents are not limited to any specific type as long as they are capable of dissolving the polyester resin related to the present invention. It is preferred to use organic solvents such as butyl acetate, ethyl acetate, tetrahydrofuran, methyl ethyl ketone, and toluene, especially preferably methyl ethyl ketone or toluene. Those solvents may be used alone or in combination thereof. When two types are combined, the ratio is preferred to be methyl ethyl ketone/toluene=1/9 to 9/1, more preferably 3/7 to 7/3, especially preferably 4/6 to 6/4.

EXAMPLES

The present invention is described below in greater detail by referring to examples and comparative examples. However, the present invention is not limited to them. Analyses and evaluations were conducted by employing the following methods.

<Composition Analysis>

A sample was dissolved in deuterochloroform, which was then subjected to an NMR composition analysis.

<NMR Conditions> instrument: ECS-400, made by JEOL, Ltd. frequency: 400 MHz ($^1$H); 100 MHz ($^{13}$C) solvent: deuterochloroform temperature: 35° C. number of integrations: 256 times ($^1$H), 15000 times ($^{13}$C)

<Solubility in Solvent>

In a glass container, 15 grams of a resin and 35 grams of a solvent mixture of methyl ethyl ketone (MEK)/toluene (TOL) (mass ratio of 1/1) (30 mass % concentration) were added and stirred to be homogenously mixed. After the mixture was kept standing at 20° C. for 6 hours, the resin solubility in the solvent was visually observed. Based on the criteria below, when the result was A or B, the resin solution was determined to be usable.

A: no turbidity or sedimentation was observed.
B: slight turbidity was observed
C: slight turbidity and sedimentation were observed
D: turbidity and sedimentation were observed.

<Solubility at Low Temperatures>

The sample used in the above solvent solubility test was kept in a freezer (−15° C.) for a month, and the solubility at low temperatures was visually observed.

A: no turbidity or sedimentation was observed
B: slight turbidity was observed
C: slight turbidity and sedimentation were observed
D: turbidity and sedimentation were observed <Solubility After High-Temperature/High-Humidity Storage>

Evaluations were conducted by the same method as in the above solvent solubility test except that the resin sample was kept for 24 hours in a thermo-hygrostat, which was set in advance to have a temperature of 40° C. and a humidity of 85%.

<Glass Transition Temperature>

By using a differential thermal analyzer DSC-60 made by Shimadzu Corporation and by setting the rate of temperature rise at 5° C./min., the value was obtained at the point where the base line on the lower temperature side of the chart intersected with the tangent line of endothermic curve near the glass transition temperature.

EXAMPLE 1

The polycarboxylic acid component and polyhydric alcohol component respectively specified in Table 1 along with 500 ppm of titanium butoxide relative to the total amount of polycarboxylic acid component were added to a reactor equipped with a distillation column. The composition ratios of polycarboxylic component and polyhydric alcohol component shown in Table 1 respectively indicate the molar parts determined when the total amount of polycarboxylic acid component was set as 100 molar parts. Polysorb-P® (made by Roquette) was used for isosorbide.

Next, while the rotation speed of the stirring blade in the reactor was kept at 200 rpm, heat was applied to raise the temperature of the reaction system to 265° C., where the temperature was kept. When esterification reaction was completed and no water distillation was observed from the reaction system, decompression was conducted for about 40 minutes to vacuum down the reaction system to 133 Pa while the temperature was kept at 265° C. Condensation reactions were carried out while the distillate was distilled from the reaction system.

As the reaction progressed, the viscosity increased in the reaction system. When the torque of the stirring blade rose 0.1 kg·cm (≈0.01 Nm) from that prior to decompression, stirring was turned off. Then, the reaction system was returned to normal pressure and the reaction product was retrieved when the pressure was raised by introducing nitrogen. Accordingly, a polyester resin was obtained.

EXAMPLES 2 TO 13, COMPARATIVE EXAMPLES 1, 2

Polyester resins were obtained by employing the same procedure as in Example 1 except that polycarboxylic acid and polyhydric alcohol components were changed as shown in Table 1.

TABLE 1

| | | | Example 1 | Example 2 | Example 3 | Example 4 | Example 5 | Example 6 | Example 7 | Example 8 | Example 9 | Example 10 | Example 11 | Example 12 | Comp. Example 1 | Comp. Example 2 |
|---|---|---|---|---|---|---|---|---|---|---|---|---|---|---|---|---|
| Prepared Composition | polycarboxylic acid | terephthalic acid | 50 | 50 | 50 | 50 | 50 | 50 | 50 | 50 | 50 | 50 | 50 | 50 | 50 | 50 |
| | | isophthalic acid | 50 | 50 | 50 | 50 | 50 | 50 | 50 | 50 | 50 | 50 | 50 | 50 | 50 | 50 |
| | polyhydric alcohol | isosorbide | 30 | 30 | 30 | 30 | 30 | 30 | 30 | 50 | 10 | 30 | 30 | 30 | 60 | 30 |
| | | ethylene glycol | 13 | 9 | 5 | 19 | 13 | 13 | 33 | 13 | 13 | 13 | 13 | 13 | 11 | 24 |
| | | neopentyl glycol | 62 | 62 | 62 | 52 | 44 | 24 | 51.9 | 42 | 62 | 62 | 62 | 62 | 32 | 62 |
| | | trimethylolpropane | 2 | 6 | 10 | 2 | 20 | 40 | 2 | 2 | 2 | — | — | 2 | 4 | 1 |
| | | glycerin | — | — | — | — | — | — | — | — | — | 2 | — | — | — | — |
| | | pentaerythritol | — | — | — | — | — | — | — | — | — | — | 2 | — | — | — |
| | | 1,4-cyclohexane dimethanol | 10 | 10 | 10 | 14 | 10 | 10 | 0.1 | 10 | 10 | 10 | 10 | — | 10 | — |
| | | 2,2-bis(4-hydroxy-cyclohexyl)propane | — | — | — | — | — | — | — | — | — | — | — | 10 | — | — |
| Resin Composition | polycarboxylic acid | terephthalic acid | 50 | 50 | 50 | 50 | 50 | 50 | 50 | 50 | 50 | 50 | 50 | 50 | 50 | 50 |
| | | isophthalic acid | 50 | 50 | 50 | 50 | 50 | 50 | 50 | 50 | 50 | 50 | 50 | 50 | 50 | 50 |
| | polyhydric alcohol | isosorbide | 29 | 29 | 27 | 30 | 28 | 29 | 30 | 48 | 9 | 29 | 28 | 29 | 58 | 30 |
| | | ethylene glycol | 13 | 9 | 8 | 19 | 13 | 13 | 33 | 13 | 26 | 14 | 14 | 13 | 12 | 26 |
| | | neopentyl glycol | 62 | 62 | 63 | 52 | 44 | 24 | 51 | 41 | 62 | 63 | 62 | 63 | 30 | 63 |
| | | trimethylolpropane | 2 | 6 | 8 | 2 | 18 | 38 | 2 | 2 | 2 | — | — | 2 | 4 | — |
| | | glycerin | — | — | — | — | — | — | — | — | — | 2 | — | — | — | — |
| | | pentaerythritol | — | — | — | — | — | — | — | — | — | — | 2 | — | — | — |
| | | 1,4-cyclohexane dimethanol | 10 | 10 | 12 | 15 | 12 | 11 | — | 11 | 12 | 12 | 11 | — | 11 | — |

TABLE 1-continued

| | Example 1 | Example 2 | Example 3 | Example 4 | Example 5 | Example 6 | Example 7 | Example 8 | Example 9 | Example 10 | Example 11 | Example 12 | Comp. Example 1 | Comp. Example 2 |
|---|---|---|---|---|---|---|---|---|---|---|---|---|---|---|
| 2,2-bis(4-hydroxy-cyclohexyl)propane | — | — | — | — | — | — | — | — | — | — | — | 10 | — | — |
| glass transition temp. (° C.) | 72 | 68 | 66 | 75 | 62 | 52 | 65 | 88 | 60 | 72 | 72 | 72 | 88 | 73 |
| solvent solubility (20° C.) | A | A | A | A | B | C | B | B | A | A | A | A | B | D |
| solvent solubility (10° C.) | A | A | A | A | B | C | B | B | A | A | A | A | B | D |
| solvent solubility (5° C.) | A | A | A | A | B | C | B | B | A | A | A | A | B | D |
| solvent solubility (−5° C.) | A | A | A | A | B | C | B | B | A | A | A | A | B | D |
| solubility at low temp. | A | A | A | A | B | C | B | C | A | A | A | A | C | D |
| solubility after high-temperature/high-humidity storage | A | A | A | A | B | C | B | C | A | A | A | A | D | D |

In Comparative Example 1, the content of isosorbide exceeded the upper limit, resulting in lower moisture resistance.

In Comparative Example 2, the content of a structural unit derived from the trihydric or higher alcohol in the resin was below the lower limit, resulting in lower solubility, especially lower solubility under low-temperature conditions.

What is claimed is:

1. A polyester resin, comprising:
   a polycarboxylic acid-derived structural unit;
   a trihydric or higher alcohol-derived structural unit;
   an isosorbide-derived structural unit; and
   a structural unit derived from a dihydric alcohol that is other than isosorbide and having an alicyclic skeleton,
   wherein 0.05 to 0.5 mol of the isosorbide-derived structural unit and 0.015 to 0.4 mol of the trihydric or higher alcohol-derived structural unit are present relative to 1 mol of the polycarboxylic acid-derived structural unit, and
   where the structural unit derived from the dihydric alcohol having an alicyclic skeleton is present at 0.001 to 0.15 mol relative to 1 mol of the polycarboxylic acid-derived structural unit.

2. The polyester resin according to claim 1, wherein the trihydric or higher alcohol-derived structural unit is present at 0.015 to 0.2 mol relative to 1 mol of the polycarboxylic acid-derived structural unit.

3. The polyester resin according to claim 1, wherein the isosorbide-derived structural unit is present at 0.05 to 0.4 mol relative to 1 mol of the polycarboxylic acid-derived structural unit.

4. The polyester resin according to claim 1, wherein the dihydric alcohol having an alicyclic skeleton is 1,4-cyclohexanedimethanol.

5. The polyester resin according to claim 1, wherein the glass transition temperature is 50 to 90° C.

6. A method for manufacturing the polyester resin according to claim 1, comprising:
   polycondensing a polycarboxylic acid component and a polyhydric alcohol component,
   wherein the polyhydric alcohol component comprises 0.05 to 0.5 mol of isosorbide, 0.015 to 0.4 mol of a trihydric or higher alcohol and 0.001 to 0.15 mol of an alicyclic dihydric alcohol relative to 1 mol of the polycarboxylic acid component.

7. A polyester resin solution, comprising the polyester resin according to claim 1 and a solvent.

8. The polyester resin solution according to claim 7, wherein the solvent is an organic solvent.

9. A coating composition, comprising the polyester resin solution according to claim 7.

10. The coating composition according to claim 9, wherein the polyester resin according to claim 1 is present at 5 to 60 mass % of the total mass of the polyester resin solution.

* * * * *